(12) United States Patent
Yang et al.

(10) Patent No.: US 7,575,629 B2
(45) Date of Patent: *Aug. 18, 2009

(54) POLLUTANT EMISSION CONTROL SORBENTS AND METHODS OF MANUFACTURE

(75) Inventors: Xiaolin David Yang, Edison, NJ (US); Pascaline Harrison Tran, Holmdel, NJ (US); Lawrence Shore, Edison, NJ (US); Stanley Scott Mack, Madison, NJ (US); James Eugene Staudt, North Andover, MA (US)

(73) Assignee: BASF Catalysts LLC, Florham Park, NJ (US)

( * ) Notice: Subject to any disclaimer, the term of this patent is extended or adjusted under 35 U.S.C. 154(b) by 551 days.

This patent is subject to a terminal disclaimer.

(21) Appl. No.: 11/290,630

(22) Filed: Nov. 30, 2005

(65) Prior Publication Data
US 2007/0122619 A1 May 31, 2007

(51) Int. Cl.
*C04B 14/02* (2006.01)
*B01J 20/00* (2006.01)
*B01J 20/10* (2006.01)
*B32B 18/00* (2006.01)
*C22B 3/00* (2006.01)
*C01G 3/12* (2006.01)
*C01G 45/00* (2006.01)
*C01G 23/00* (2006.01)
*C01G 19/00* (2006.01)
*C01G 49/12* (2006.01)
*B01D 53/46* (2006.01)
*C01B 17/22* (2006.01)

(52) U.S. Cl. ............ 106/705; 502/400; 502/407; 428/403; 423/1; 423/48; 423/49; 423/84; 423/89; 423/138; 423/210; 423/561.1

(58) Field of Classification Search ............ 502/400, 502/401, 402, 403, 404, 405, 406, 407, 408, 502/409; 428/403; 106/705; 423/48, 49, 423/84, 89, 138, 210, 561.1, 566.1
See application file for complete search history.

(56) References Cited

U.S. PATENT DOCUMENTS 4,094,777 A 6/1978 Sugier et al.

(Continued)

FOREIGN PATENT DOCUMENTS

EP 0043759 A1 1/1982

(Continued)

OTHER PUBLICATIONS

PCT/US2006/044711—PCT International Search Report, 3 pgs.

(Continued)

*Primary Examiner*—Timothy C Vanoy
*Assistant Examiner*—Daniel Berns
(74) *Attorney, Agent, or Firm*—Scott S. Servilla; Diehl Servilla LLC; Melanie L. Brown (57) ABSTRACT

Sorbents for removal of mercury and other pollutants from gas streams, such as a flue gas stream from coal-fired utility plants, and methods for their manufacture and use are disclosed. The methods include mixing fly ash particles with a sulfide salt and a metal salt to form a metal sulfide on the outer surface of the fly ash particles.

20 Claims, 2 Drawing Sheets

U.S. PATENT DOCUMENTS

| | | | |
|---|---|---|---|
| 4,708,853 | A | 11/1987 | Matviya et al. |
| 5,245,106 | A | 9/1993 | Cameron et al. |
| 5,306,474 | A | 4/1994 | Kida et al. |
| 5,405,593 | A | 4/1995 | Knudson |
| 5,409,522 | A | 4/1995 | Durham et al. |
| 5,505,766 | A | 4/1996 | Chang |
| 5,569,436 | A | 10/1996 | Lerner |
| 5,607,496 | A | 3/1997 | Brooks |
| 5,618,508 | A | 4/1997 | Suchenwirth et al. |
| 5,695,726 | A | 12/1997 | Lerner |
| 5,787,823 | A * | 8/1998 | Knowles ................. 110/344 |
| 5,827,352 | A | 10/1998 | Altman et al. |
| 5,854,173 | A | 12/1998 | Chang et al. |
| 5,868,829 | A | 2/1999 | Biermann et al. |
| 5,897,688 | A | 4/1999 | Voogt et al. |
| 5,948,143 | A | 9/1999 | Sjostrom |
| 6,027,551 | A | 2/2000 | Hwang et al. |
| 6,132,801 | A | 10/2000 | Linford |
| 6,136,072 | A | 10/2000 | Sjostrom et al. |
| 6,375,909 | B1 | 4/2002 | Dangtran et al. |
| 6,387,841 | B1 | 5/2002 | Devlin et al. |
| 6,521,021 | B1 | 2/2003 | Pennline et al. |
| 6,558,454 | B1 | 5/2003 | Chang et al. |
| 6,638,485 | B1 | 10/2003 | Iida et al. |
| 6,695,894 | B2 | 2/2004 | Chang et al. |
| 6,712,878 | B2 | 3/2004 | Chang et al. |
| 6,719,828 | B1 | 4/2004 | Lovell et al. |
| 6,770,250 | B2 | 8/2004 | Cooper et al. |
| 6,818,043 | B1 | 11/2004 | Chang et al. |
| 7,048,781 | B1 | 5/2006 | Lovell |
| 7,288,499 | B1 | 10/2007 | Lovell et al. |
| 2002/0018853 | A1 | 2/2002 | Khare |
| 2003/0103882 | A1 | 6/2003 | Biermann et al. |
| 2003/0104937 | A1 | 6/2003 | Sinha |
| 2003/0118493 | A1 | 6/2003 | Cooper et al. |
| 2003/0176396 | A1 | 9/2003 | Shea et al. |
| 2003/0206843 | A1 | 11/2003 | Nelson |
| 2004/0003716 | A1 | 1/2004 | Nelson |
| 2004/0081606 | A1 | 4/2004 | Cooper et al. |
| 2004/0202596 | A1 | 10/2004 | Honjo et al. |
| 2005/0103243 | A1 * | 5/2005 | Lissianski et al. ........... 110/345 |
| 2007/0122327 | A1 * | 5/2007 | Yang et al. ................. 423/210 |

FOREIGN PATENT DOCUMENTS

| | | |
|---|---|---|
| EP | 0145539 | 6/1985 |
| EP | 0271618 | 6/1988 |
| EP | 0480603 A2 | 4/1992 |
| EP | 0 484 234 A2 | 5/1992 |
| EP | 0930091 | 7/1999 |
| WO | WO0172395 | 10/2001 |
| WO | WO0185307 | 11/2001 |

OTHER PUBLICATIONS

"Control of Mercury Emissions From Coal-Fired Electric Utility Boilers", *EPA Report*, EPA-600/R-01-109, (Apr. 2002).

"Non Final Office Action mailed Oct. 28, 2008—U.S. Appl. No. 11/291,091," 23 pgs.

Non-Final Office Action in U.S. Appl. No. 11/290,631, dated Dec. 31, 2008, 34 pgs.

Final Office Action in U.S. Appl. No. 11/291,091, dated Feb. 9, 2009, 12 pgs.

* cited by examiner

POLLUTANT EMISSION CONTROL SORBENTS AND METHODS OF MANUFACTURE

TECHNICAL FIELD

Embodiments of the invention relate to pollutant emission control sorbents and methods for their manufacture and use.

BACKGROUND ART

Emission of pollutants, for example, mercury, from sources such as coal-fired and oil-fired boilers has become a major environmental concern. Mercury (Hg) is a potent neurotoxin that can affect human health at very low concentrations. Mercury emission from sources such as coal-fired and oil-fired boilers has become a major environmental concern. The largest source of mercury emission in the United States is coal-fired electric power plants. Coal-fired power plants account for between one-third and one-half of total mercury emissions in the United States. Mercury is found predominantly in the vapor-phase in coal-fired boiler flue gas. Mercury can also be bound to fly ash in the flue gas.

On Dec. 15, 2003, the Environmental Protection Agency (EPA) proposed standards for emissions of mercury from coal-fired electric power plants, under the authority of Sections 111 and 112 of the Clean Air Act. In their first phase, the standards could require a 29% reduction in emissions by 2008 or 2010, depending on the regulatory option chosen by the government. In addition to EPA's regulatory effort, in the United States Congress, numerous bills recently have been introduced to regulate these emissions. These regulatory and legislative initiatives to reduce mercury emissions indicate a need for improvements in mercury emission control technology.

There are three basic forms of Hg in the flue gas from a coal-fired electric utility boiler: elemental Hg (referred to herein by the symbol $Hg^0$); compounds of oxidized Hg (referred to herein the symbol $Hg^{2+}$ herein); and particle-bound mercury. Oxidized mercury compounds in the flue gas from a coal-fired electric utility boiler may include mercury chloride ($HgCl_2$), mercury oxide (HgO), and mercury sulfate ($HgSO_4$). Oxidized mercury compounds are sometimes referred to collectively as ionic mercury. This is because, while oxidized mercury compounds may not exist as mercuric ions in the boiler flue gas, these compounds are measured as ionic mercury by the speciation test method used to measure oxidized Hg. The term speciation is used to denote the relative amounts of these three forms of Hg in the flue gas of the boiler. High temperatures generated by combustion in a coal boiler furnace vaporize Hg in the coal. The resulting gaseous $Hg^0$ exiting the furnace combustion zone can undergo subsequent oxidation in the flue gas by several mechanisms. The predominant oxidized Hg species in boiler flue gases is believed to be $HgCl_2$. Other possible oxidized species may include HgO, $HgSO_4$, and mercuric nitrate monohydrate ($Hg(NO_3)_2 \cdot H_2O$).

Gaseous Hg (both $Hg^0$ and $Hg^{2+}$) can be adsorbed by the solid particles in boiler flue gas. Adsorption refers to the phenomenon where a vapor molecule in a gas stream contacts the surface of a solid particle and is held there by attractive forces between the vapor molecule and the solid. Solid particles are present in all coal-fired electric utility boiler flue gas as a result of the ash that is generated during combustion of the coal. Ash that exits the furnace with the flue gas is called fly ash. Other types of solid particles, called sorbents, may be introduced into the flue gas stream (e.g., lime, powdered activated carbon) for pollutant emission control. Both types of particles may adsorb gaseous Hg in the boiler flue gas.

Sorbents used to capture mercury in flue gas are characterized by their physical and chemical properties. The most common physical characterization is surface area. The interior of certain sorbent particles are highly porous. The surface area of sorbents may be determined using the Brunauer, Emmett, and Teller (BET) method of $N_2$ adsorption. Surface areas of currently used sorbents range from 5 $m^2/g$ for Ca-based sorbents to over 2000 $m^2/g$ for highly porous activated carbons. EPA Report, Control of Mercury Emissions From Coal-Fired Electric Utility Boilers, Interim Report, EPA-600/R-01-109, April 2002. For most sorbents, mercury capture often increases with increasing surface area of the sorbent.

Mercury and other pollutants can be captured and removed from a flue gas stream by injection of a sorbent into the exhaust stream with subsequent collection in a particulate matter control device such as an electrostatic precipitator or a fabric filter. Adsorptive capture of Hg from flue gas is a complex process that involves many variables. These variables include the temperature and composition of the flue gas, the concentration of Hg in the exhaust stream, and the physical and chemical characteristics of the sorbent. Of the known Hg sorbents, activated carbon and calcium-based sorbents have been the most actively studied.

Currently, the most commonly used method for mercury emission reduction is the injection of powdered activated carbon into the flue stream of coal-fired and oil-fired plants. Coal-fired combustion flue gas streams are of particular concern because their composition includes trace amounts of acid gases, including $SO_2$ and $SO_3$, NO and $NO_2$, and HCl. These acid gases have been shown to degrade the performance of activated carbon. Though powdered activated carbon is effective to capture oxidized mercury species such as $Hg^{+2}$, powdered activated carbon (PAC) is not as effective for elemental mercury which constitutes a major Hg species in flue gas, especially for subbituminous coals and lignite. There have been efforts to enhance the $Hg^0$ trapping efficiency of PAC by incorporating bromine species. This, however, not only introduces significantly higher cost, but a disadvantage to this approach is that bromine itself is a potential environmental hazard. Furthermore, the presence of PAC hinders the use of the fly ash for cement industry and other applications due to its color and other properties.

As noted above, alternatives to PAC sorbents have been utilized to reduce mercury emissions from coal-fired boilers. Examples of sorbents that have been used for mercury removal include those disclosed in U.S. Patent Application Publication No. 2003/0103882 and in U.S. Pat. No. 6,719,828. In U.S. Patent Application Publication No. 2003/0103882, calcium carbonate and kaolin from paper mill waste sludge were calcined and used for Hg removal at high temperatures above 170° C., preferably 500° C. U.S. Pat. No. 6,719,828 teaches the preparation of layered sorbents such as clays with metal sulfide between the clay layers and methods for their preparation. The method used to prepare the layered sorbents is based on an ion exchange process, which limits the selection of substrates to only those having high ion exchange capacity. In addition, ion exchange is time-consuming and involves several wet process steps, which significantly impairs the reproducibility, performance, scalability, equipment requirements, and cost of the sorbent. For example, a sorbent made in accordance with the teachings of U.S. Pat. No. 6,719,828 involves swelling a clay in an acidified solution, introducing a metal salt solution to exchange metal ions between the layers of the clay, filtering the ion exchanged clay, re-dispersing the clay in solution, sulfidation of the clay by adding another sulfide solution, and finally the product is filtered and dried. Another shortcoming of the process disclosed in U.S. Pat. No. 6,719,828 is that the by-products of the ion exchange process, i.e., the waste solutions containing metal ions and hydrogen sulfide generated from the acidic solution, are an environmental liability.

As noted above, mercury can be bound to fly ash in the flue gas. Fly ash is a very low cost raw material as a by-product waste of coal-fired utility power plants. Sixty million tons of the material is produced annually in North America alone. Some fly ash is recycled and used in the construction industry, most typically as an ingredient in cements. However, approximately 70 to 75 percent of fly ash generated is still disposed of in landfills or in storage lagoons, and much of this material can be recovered and used.

There is an ongoing need to provide improved pollutant sorbents and methods for their manufacture. It would be desirable to provide a simple and environmentally friendly—method that effectively disperses metal sulfide on a readily available substrate, which does not need to require the numerous steps involved in an ion exchange process. In addition, it would be beneficial to provide methods and apparatus for the recovery and modification of fly ash such that the fly ash could be used to effectively capture pollutants such as mercury from flue gas streams.

DISCLOSURE OF THE INVENTION

Aspects of the invention include sorbents, methods of manufacture, and systems and methods for removal of pollutants from gas streams. In particular, the sorbents and systems are useful for, but not limited to, the removal of heavy metals such as mercury from flue gas streams generated by the combustion of coal. One aspect of the present invention relates to a sorbent made by a method comprising mixing a metal salt and a sulfide salt with fly ash substrate particles to form a sulfide on the outer surface of the particles; and drying the mixture. In certain embodiments, the method may include reducing the particle size of the particles. According to other aspects, sorbents are provided comprising fly ash particles containing a metal sulfide formed on the outer surface of the fly ash particles.

BEST MODE FOR CARRYING OUT THE INVENTION

Before describing several exemplary embodiments of the invention, it is to be understood that the invention is not limited to the details of construction or process steps set forth in the following description. The invention is capable of other embodiments and of being practiced or being carried out in various ways.

Aspects of the invention provide improved pollutant sorbents, which may be used to remove mercury from the flue gases of coal-fired and oil-fired boilers, methods for manufacturing such sorbents, and systems and methods utilizing these sorbents.

Applicants have determined that an ion exchange process, such as the type used in U.S. Pat. No. 6,719,828, is not necessary for mercury capture by the sorbent material. Accordingly, a wide variety of substrates, regardless of their porosity, purity, or ion exchange capacity, can be manufactured and used for mercury removal in accordance with the present invention. Mercury removal data shown below in the Examples show that non-porous, low surface area materials such as fly ash provide comparable, or in some instances, better mercury removal efficiency than ion exchangeable clays such as bentonite, when the same amount of metal sulfide was dispersed on the substrates according to the methods disclosed herein.

According to one or more embodiments, incipient wetness or solid-state reactive grinding processes are used to disperse metal sulfide salts on the surface of low surface sorbent particles such as fly ash. The incipient wetness or solid-state reactive grinding methods disclosed herein do not require excessive liquids to disperse the sulfide salts, thus eliminating problems associated with wet processes such as ion exchange processes. These problems may include disposal of excessive liquids containing waste of metal ions solution or hydrogen sulfide. In addition, certain embodiments of the present invention provide accurate control of the amount of metal sulfide on the surface of the sorbent. Further, the processes according to certain embodiments are much faster and significantly reduce the equipment and resources required for the large-scale production. Moreover, the highly dispersed metal sulfide on the surface of the sorbent provides better contact between Hg and metal sulfide when used for mercury removal, as evidenced by the higher and faster mercury capture than those obtained by the ion exchange process when measured by an in-flight test with simulated flue gases.

According to one embodiment of the invention, the steps for making surface-dispersed metal sulfide include: mixing a metal salt with a sorbent particle by grinding or milling; adding and mixing a sulfide salt with the metal salt and sorbent particle mixture; and drying the mixture. In certain embodiments, the method may further include milling the resultant material to the desired particle size. For low metal sulfide loading, the sulfide is added by incipient wetness as described below. For high metal sulfide loading, the sulfide is added by solid-state grinding or mixing.

While embodiments of the present invention should not be limited by a particular theory of operation or scientific principle, it is believed that the metal salt (e.g., $CuCl_2$) reacts with sulfide (e.g., $Na_2S$) in situ during incipient wetness or grinding to form a metal sulfide (for example, CuS) on the surface of the substrate particles either during the incipient wetness or said solid-state reactive grinding. Since most metal salts and sulfides are crystal hydrates, for high metal sulfide loading, the water released from the chemicals during solid-state reactive grinding is sufficient to moisten the mixture. As an example, the following reaction, Reaction 1:

$$CuCl_2 \cdot 2H_2O + Na_2S \cdot 9H_2O \rightarrow CuS + 2NaCl + 11H_2O,$$

demonstrates that no additional water is required to disperse CuS in the mixture.

The metal salts used according to method embodiments include any metal salt that can release a metal ion with any oxidation states when the salt contacts a sulfide salt and thereafter forms water insoluble metal sulfide on the surface of a substrate. The metal includes alkaline earth metals and the metals that have an atomic number of between 21 and 30, between 39 and 50, and between 57 and 79, and combinations thereof. Presently preferred metal ions include $Cu^{+2}$, $Mn^{+4}$, $Fe^{+3}$, $Ti^{+3}$, $Ti^{+4}$, $Sn^{+2}$, and $Sn^{+4}$, and combinations thereof, and presently preferred salts are nitrate, chloride, sulfate, and acetate, and combinations thereof. The loading level of metal (on a dry basis) is between about 0 and 100 weight percent, preferably between about 1 and 50 weight percent, and most preferably between about 1 and 10 weight percent.

Any sulfide precursor that forms the $S^{-2}$ anion can be used in accordance with embodiments of the invention. This includes, but is not limited to, $Na_2S$ and $(NH_4)_2S$. $Na_2S$ is a presently preferred sulfide precursor. Sulfide loading level can be stoichiometric (1:1 atomic ratio) or different than that of the metal ion.

Dispersion of the metal sulfide can be accomplished by any method as long as the metal sulfide is well dispersed on the surface of the substrate. Such methods include, but are not limited to, incipient wetness, solid-state reactive grinding, spray-drying, sprinkling of solution on the solid, precipitation, co-precipitation, etc. Presently preferred methods are solid-state reactive grinding for high metal sulfide loading, incipient wetness for low metal sulfide loading, or a combination of grinding and incipient wetness. The metal sulfides can be added to the substrate one salt at a time (e.g., add $CuCl_2$ first followed by adding $Na_2S$, or add $Na_2S$ first followed by copper salts), two salts at the same time (e.g., co-precipitation), or directly mixing fine metal sulfide powder with the substrate.

Additional steps according to embodiments of the invention may include drying and milling the fly ash sorbent. Drying may be accomplished by any means such as static, spray-drying, microwave drying, or on a moving belt at a temperature between about 25 and 200° C. for 0 to 15 hours, preferably between about 60 and 150° C., most preferably between about 90 and 120° C. The sorbent can be milled to an average particle size below about 80 μm, preferably below about 40 μm. Preferably, the milling occurs after drying.

Contrary to the teachings in the prior art, experimentation has shown that a non-layered material having low porosity can be effectively used as a support for mercury removal from utility power plant flue gas. A preferred sorbent material according to embodiments of the present invention is modified fly ash. As used herein, modified fly ash refers to fly ash that has been processed in a manner to form a metal sulfide on the surface of the fly ash particles to enhance the mercury capture properties of the fly ash particles. We have found that the low porosity (less than 1 $m^2/g$ of BET surface area) of the fly ash makes it possible to completely disperse a modifying agent such as metal sulfide, which enhances the mercury capture of the fly ash. The modifying agent can be completely dispersed on the surface of fly ash which permits sufficient contact with Hg vapor during the short contact time when used as a sorbent in flue gas. This not only increases the total mercury removal, but more importantly, the removal rate which measures how fast mercury is captured by the sorbent. In detailed aspects of the invention, the fly ash has a surface area less than about 10 $m^2/g$.

It is known that the existence of chloride ions in the flue gas helps remove Hg by oxidizing elemental Hg to its ionic form or form complex with ionic mercury. Experimental data demonstrates that chloride and other halogen anions such as bromide and iodide level on the sorbent also affects the mercury capture rate of the sorbent when there is no other source of chloride ions in the gas stream. While the present invention should not be limited to a particular theory of operation, it is believed that chloride ions in the sorbent enhance mercury capture by forming a complex with mercury.

One useful aspect of fly ash is that a fly ash-based sorbent can be produced on-site at a power plant in which the sorbent is used. A self-contained operation that utilizes fly ash from the plant that produces the material can aid control of the quality and consistency of the fly ash.

Fly ash is a low cost raw material as a waste product of a utility power plant. The use of the non-porous, non-layered support reduces the amount of modifying agent required for mercury adsorption and results in a further reduction of sorbent cost. The ability to produce the sorbent on-site at a power plant provides further cost saving because the cost of transportation can be eliminated.

Native, unmodified fly ash has some mercury capture capacity, capturing about 10-20% of mercury, depending on the fly ash properties. The bonding of mercury on native, unmodified fly ash is weak, however, and some of the adsorbed mercury can be released during transportation or processing. Thus, on-site production of modified fly ash-based sorbent can be used to increase the bonding of the mercury to the fly ash and to eliminate potential mercury release.

Figure 1:
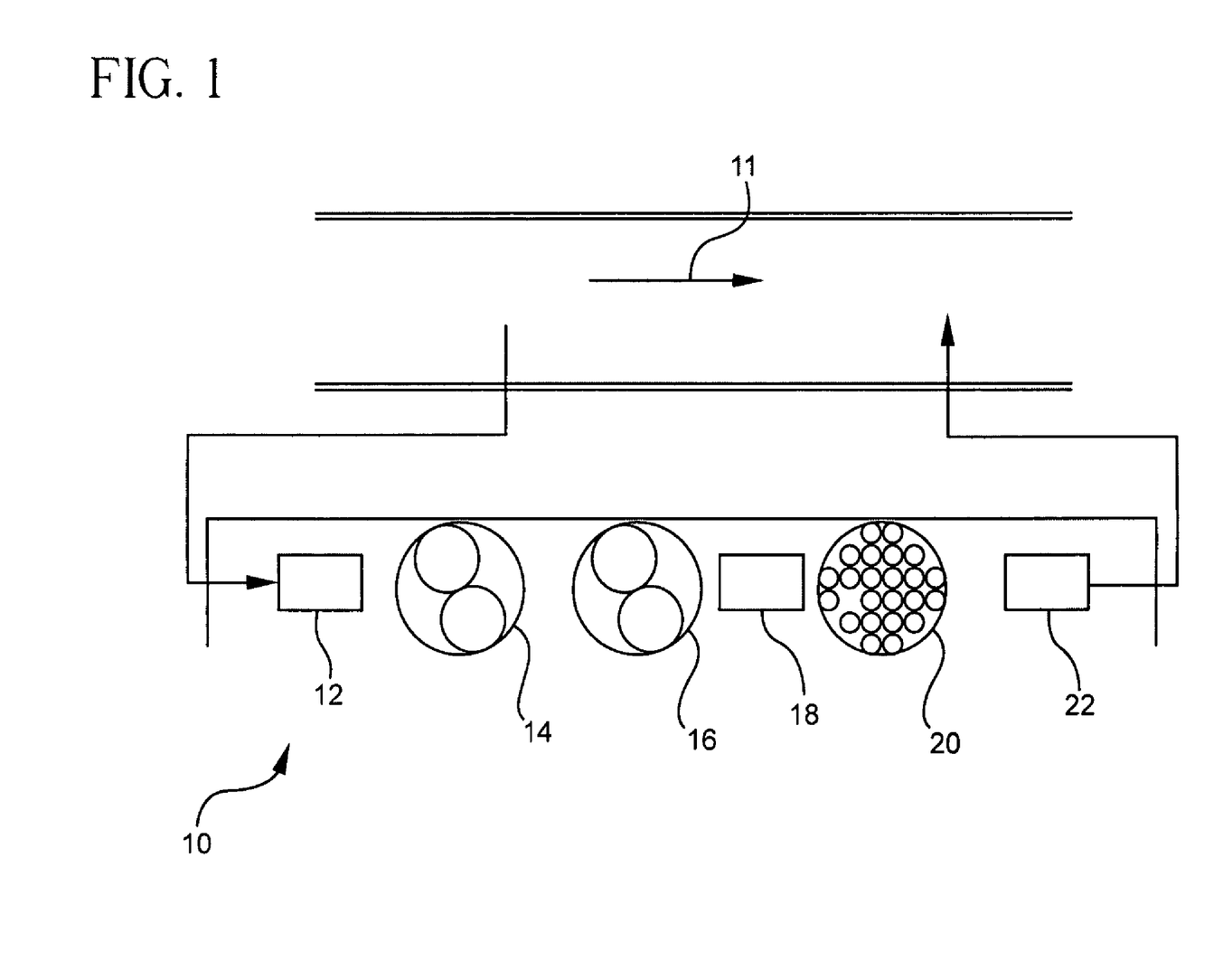
FIG. 1 shows a schematic view of a system for processing fly ash particles on site in accordance with an embodiment of the invention.

FIG. 1 is a schematic diagram showing a continuous fly ash production and modification system 10. The entire system can be placed in a closed space to minimize or prevent the release of harmful chemicals or dust to the environment. The system can be either permanently attached to a utility boiler system or set on a mobile base.

According to one or more embodiments, the fly ash modification system 10 shown in FIG. 1 includes an introduction mechanism 12 for transporting the native fly ash either directly from the boiler system or bag house (not shown), or from a particle size reduction apparatus (not shown) to reduce the fly ash to the desired particle size. The introduction mechanism can be any suitable mechanism known in the art for transporting a particulate material. For example, a conveyor such as a belt conveyor can be used to move the powdered fly ash from one location such as the bag house that collects fly ash from the flue gas stream 11 to the modification apparatus 10.

The unmodified fly ash is then moved to mixing apparatus 14, in which metal salt powders are added to and then mixed with the fly ash. The mixing apparatus 14 can comprise any suitable mixing apparatus. For example, the mixing can be accomplished by compressing the fly ash and the metal salt between two or more rotating cylinders or rods. Examples of suitable metal salts include copper salts such as $CuSO_4$ and $CuCl_2$, but other copper salt precursors can be used as well. We have found that a mixture of $CuSO_4.5H_2O$ and $CuCl_2.2H_2O$ at a weight ratio of 3:1 gives very good Hg-removal. The chloride in the copper salt can be replaced by other halogen elements such as Br and I. A precursor sulfide salt is added for reaction with the metal salts as described above. The addition of the precursor sulfide salt can be in the same mixing apparatus 14 or in a separate mixing apparatus 16. Typically, moisture will be released due to Reaction 1. The released moisture helps to disperse the newly formed CuS over the surface of the material. The wetness of the paste depends on the type of the fly ash and the level of Cu loading. It is believed that a Cu loading between about 0.01 and 20 weight percent (on a moisture free basis) is desired. More specifically, a preferred Cu loading for mercury removal sorbent production is in the range of about 1 and 10 weight percent.

In addition to Cu, other metals with atomic numbers between 20-34, 38-52, and 56-79 can be also used. High oxidation states of the metals are preferred since they can oxidize elemental mercury to ionic form which, in turn, reacts with $S^{-2}$ to form HgS which has a very low solubility constant. We have found experimentally that the solid-state reaction takes a few minutes to complete. Adding some water during the reactive grinding may help speed up the reaction and disperse newly formed CuS.

After the raw materials have been mixed, the moistened paste can then be dried in a drying apparatus 18 and then the particle size of the modified fly ash can be optionally reduced in a particle size reduction apparatus 20, if necessary. Typically, a much more extensive grinding is needed after drying to reduce the solid particle size to $D_{90}$ below about 80 microns, preferably below about 40 microns. An on-line sampling port (not shown) can be installed down-stream for sorbent quality monitoring. The finished sorbent product 22 can be either injected directly into the flue gas or bagged for storage.

Without intending to limit the invention in any manner, the present invention will be more fully described by the following examples.

EXAMPLE 1

Preparation of CuS/Fly Ash Sorbent (3% Cu) via Reactive Grinding

First, 0.29 g $CuCl_2.2H_2O$, 0.87 g $CuSO_4.5H_2O$ and 10 g fly ash were ground together, ensuring that the copper salts are fully mixed with fly ash. Then, 1.25 g $Na_2S.9H_2O$ was added to the above mixture and the mixture was ground again. The mixture became moist and turned dark as heat was released as a result of Reaction 1. Grinding was stopped when there was no more physical change. The sample was then dried at 110° C. until the free moisture was completely removed. The sample was then ground to pass through a 325 mesh sieve.

EXAMPLE 2

Preparation of CuS/Fly Ash Sorbent (1% Cu) via Incipient Wetness

First, 0.097 g $CuCl_2.2H_2O$, 0.29 g $CuSO_4.5H_2O$ and 10 g fly ash were ground together, ensuring that the copper salts are fully mixed with the fly ash. Then, 0.416 g $Na_2S.9H_2O$ was mixed in 1.60 g $DI-H_2O$ to provide a solution. The solution was added to the solid mixture drop-wise while stirring the solid vigorously. The mixture moistened and turned dark as heat was released as a result of Reaction 1. Mixing was stopped when there was no more physical change. The sample was dried at 110° C. until the free moisture was completely removed. The dried sample was ground to pass through a 325 mesh sieve.

EXAMPLE 3

Preparation of CuS/Bentonite Sorbent (5% Cu) via Reactive Grinding

First, 0.49 g $CuCl_2.2H_2O$, 1.45 g $CuSO_4.5H_2O$ and 10 g bentonite were mixed together to ensure that the copper salts were fully mixed with the clay. Then, 2.08 g $Na_2S.9H_2O$ was added to the above mixture, and the mixture was ground again. The mixture moistened and turned dark as heat was released as a result of Reaction 1. Grinding was stopped when there was no more physical change. The sample was dried at 110° C. until the free moisture was completely removed. The dried sample was ground to pass through a 325 mesh sieve.

EXAMPLE 4

Preparation of CuS/Fly Ash Sorbent (1% Cu) via Incipient Wetness

First, 0.097 g $CuCl_2.2H_2O$, 0.29 g $CuSO_4.5H_2O$ and 10 g fly ash were ground together in a solid mixture, making sure that the copper salts were fully mixed with fly ash. Then, 0.416 g $Na_2S.9H_2O$ was added to 2.0 g $DI-H_2O$ to form a solution. The solution was added to the solid mixture drop-wise while stirring the solid vigorously. The mixture immediately moistened and turned dark as heat was released as a result of Reaction 1. Mixing was stopped when there was no more physical change. The sample was dried at 110° C. until the free moisture was completely removed, and the sample was ground to pass through a 325 mesh sieve.

EXAMPLE 5

Preparation of CuS/Fly Ash Sorbent (3% Cu, Copper Sulfate Only) via Reactive Grinding First, 1.30 g $CuSO_4.5H_2O$ and 10 g fly ash were ground together, ensuring that the copper salts were fully mixed with fly ash. Then, 1.25 g $Na_2S.9H_2O$ was added to the above mixture and the mixture was ground again. The mixture became moist and dark as heat was released due to Reaction 1. Grinding was stopped when there was no more physical change. The sample was dried at 110° C. until the free moisture was completely removed, and the sample was then ground to pass through 325 mesh sieve.

EXAMPLE 6

Preparation of CuS/Fly Ash Sorbent (3% Cu, Copper Chloride Only) via Reactive Grinding First, 0.885 g $CuCl_2.2H_2O$ and 10 g fly ash were ground together, making sure that the copper salts were fully mixed with the fly ash. Then, 1.25 g $Na_2S.9H_2O$ was added to the above mixture and the mixture was ground again. The mixture became moist and dark as heat was released due to Reaction 1. Grinding was stopped when there was no more physical change. The sample was dried at 110 ° C. until the free moisture was completely removed, and the sample was ground to pass through a 325 mesh sieve.

EXAMPLE 7

Total Mercury Removal Measurement via In-Flight Test

The total mercury removal was measured by an in-flight test conducted by the Institute for Combustion Science and Environmental Technology (ICSET) of Western Kentucky University using a lab-scale multiphase flow reactor. A simulated gas containing 5% oxygen and 14% carbon dioxide was used. Compressed air was the carrier gas. To make the simulated gas composition as close to that of the flue gas as possible, sorbent was diluted in a fly ash of choice by a ratio of about 4:1000 and the injection rate was carefully controlled. Mercury concentration was measured by Continuous Emission Monitoring (CEM) and the Ontario-Hydro Method (OHM) sampling located in the inlet, middle point, and outlet of the reactor.

Figure 2:
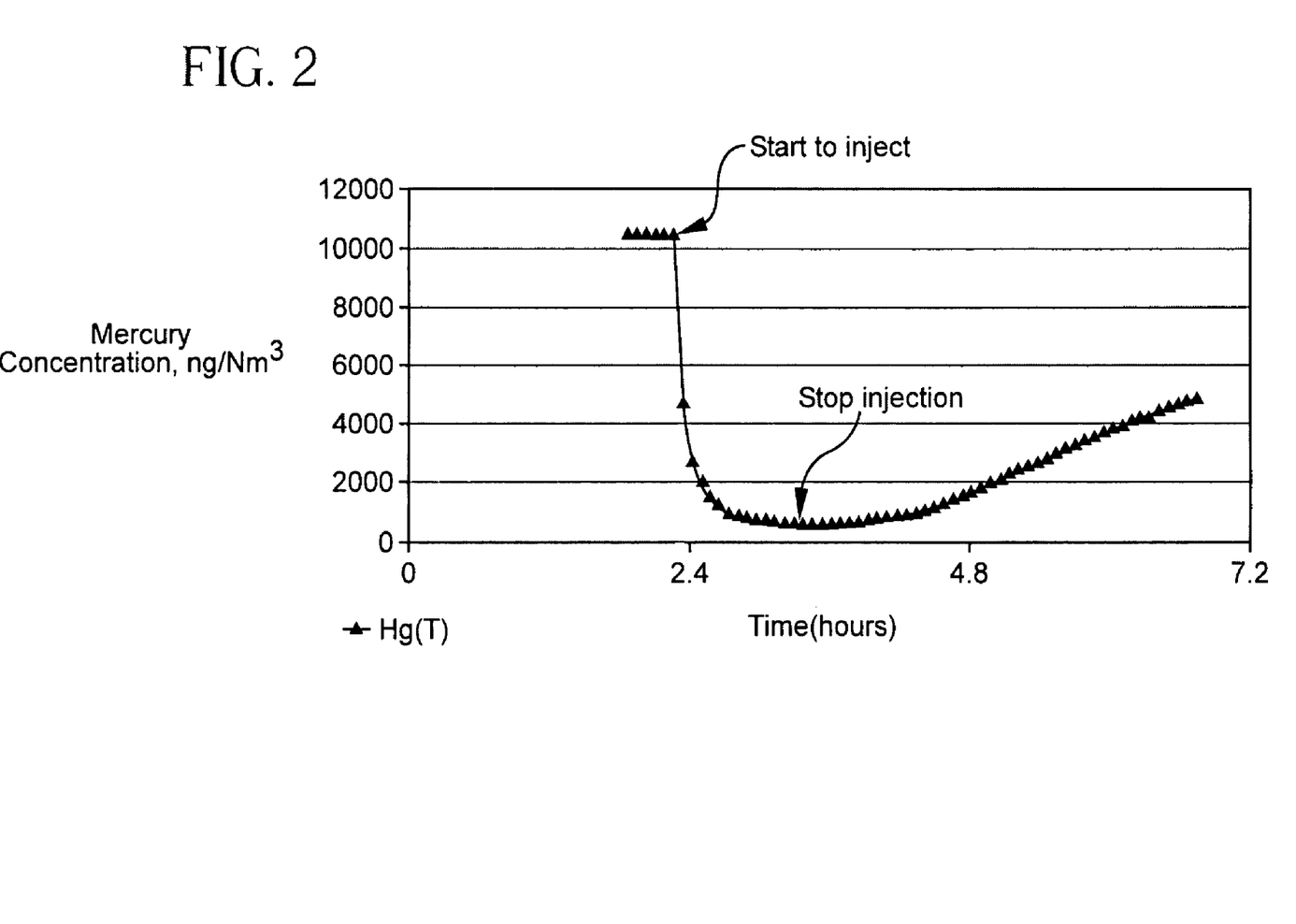
FIG. 2 is a graph showing a typical dynamic Hg concentration profile measured in the multiphase flow reactor after modified fly ash particles have been introduced into the reactor.

FIG. 2 shows a typical dynamic Hg concentration profile measured in the multiphase flow reactor at a temperature of 170° C., a sorbent/fly ash injection rate 4.0 lb/MMacf, a total injection time of 67 minutes, a sorbent residence time of 1 second, and an inlet Hg concentration of 10,544 ng/Nm³. Bituminous fly ash was used to mix with the sorbent. As the sorbent/fly ash mixture was injected into the reactor, the Hg concentration dropped rapidly and eventually reached a valley plateau, at which the injection was stopped and the total removal was calculated by the difference of the Hg concentration of the start and stop of the injection.

Table 1 lists the total mercury removal as a function of CuS loading (expressed in Cu wt %) for both fly ash and bentonite based sorbents. The data shows that fly ash supported sorbents provided higher Hg-removal at lower CuS loading than the porous bentonite supported sorbent which has a BET surface area of 35 m²/g. For example, at low CuS loading of 1% Cu, it is believed that the bentonite sample had a quite low Hg-removal of 34% since most of the CuS may have been "hidden" in the interlayers of the clay while every bit of CuS is useful in the fly ash sample, evidenced by its high Hg-removal of 84%. Increasing the CuS loading level to 3% Cu did not dramatically improve the Hg-removal for fly ash, but increased the Hg-removal significantly for the bentonite sample to 77%. Other low cost and low porosity substrates such as kaolin clay were also examined and they all performed reasonably well, but not as well as fly ash. Sorbents having a higher porosity tended to have a lower Hg-removal.

TABLE 1

Hg-removal (%) measured by multiphase flow reactor

| Cu, % | Fly ash | Bentonite |
|---|---|---|
| 0 | 16 | 16 |
| 1 | 84 | 34 |
| 3 | 94 | 77 |
| 5 | / | 82 |

Table 2 shows the effect of chloride on the sorbent on Hg-removal. At the same Cu loading of 3%, only 61% of Hg was removed when pure $CuSO_4$ was used. While over 90% of Hg was removed when either pure $CuCl_2$ or a mixture of $CuCl_2$ and $CuSO_4$ was used. It is clear the presence of the chloride ions in the sorbent composition improves mercury removal.

TABLE 2

Effect of Chloride on Hg-removal (%)

| Example # | Cu, % | Cu precursor | Hg Removal, % |
|---|---|---|---|
| 1 | 3 | $CuCl_2/CuSO_4$ mixture | 94 |
| 5 | 3 | $CuCl_2$ only | 91 |
| 6 | 3 | $CuSO_4$ only | 61 |

TABLE 3

Physical and chemical properties of the fly ash compared with bentonite

| Support | Supplier or Source | Particle Size $D_{90}$, μm |
|---|---|---|
| Bentonite | BPM Minerals, LLC | 48, as received |
| Fly ash | APS Four Corner Generating Station | 64, as received |

TABLE 3-continued

Physical and chemical properties of the fly ash compared with bentonite

| | $N_2$ Surface Area (m²/g) | $N_2$ Pore Volume (cc/g) | Pore Diameter (nm) |
|---|---|---|---|
| Bentonite | 35.4 | 0.11 | 12.2 |
| Fly Ash | 0.9 | 0.00 | 16.6 |

Main Chemical Compositions (wt %)

| | $SiO_2$ | $Al_2O_3$ | $Fe_2O_3$ | $K_2O$ | MgO | $Na_2O$ | $TiO_2$ | CaO |
|---|---|---|---|---|---|---|---|---|
| Bentonite | 67.50 | 20.20 | 3.20 | 0.51 | 2.06 | 2.64 | 0.23 | 2.42 |
| Fly ash | 57.28 | 31.00 | 3.28 | 0.64 | 0.75 | 1.41 | 1.17 | 3.28 |

| | XRD Crystallinity | Structure |
|---|---|---|
| Bentonite | crystalline | layered. interlayer accessible |
| Fly Ash | crystalline | mullite, non-porous |

It will be apparent to those skilled in the art that various modifications and variations can be made to the present invention without departing from the spirit or scope of the invention. For example, while the sorbents disclosed herein are particularly useful for removal of mercury from the flue gas of coal-fired boilers, the sorbents can be used to remove heavy metals such as mercury from other gas streams, including the flue gas of municipal waste combustors, medical waste incinerators, and other Hg-emission sources. Furthermore, the modified fly ash can be also used to trap NOx and SOx in the flue gas. Thus, it is intended that the present invention cover modifications and variations of this invention provided they come within the scope of the appended claims and their equivalents.

What is claimed is:

1. A method of making sorbent particles for the removal of pollutants from a gaseous stream comprising:
   mixing a metal salt and a sulfide salt with fly ash substrate particles having an outer surface by grinding, milling or incipient wetness to form a metal sulfide on the particles; and
   drying the particles.

2. The method of claim 1, wherein the fly ash particles are obtained directly from a boiler gas stream, processed at the same site as the boiler and introduced in the boiler gas stream.

3. The method of claim 1, wherein the metal sulfide is formed on the outer surface of the particle.

4. The method of claim 1, further comprising reducing the size of the fly ash particles.

5. The method of claim 1, wherein the metal salt is selected from the group consisting of nitrate, chloride, sulfate, acetate salts, and combinations thereof.

6. The method of claim 1, wherein the loading level of the metal is between about 1 and 20 weight percent.

7. The method of claim 1, wherein the sulfide salt is a sulfide precursor that forms the $S^{-2}$ anion.

8. The method of claim 7, wherein the sulfide precursor is selected from the group consisting of $Na_2S$ and $(NH_4)_2S$.

9. The method of claim 1, wherein the sorbent particle size is reduced to an average particle size of less than about 80 μm.

10. The method of claim 1, wherein the drying occurs at a temperature of between about 90 and 140° C.

11. The method of claim 1, wherein the metal sulfide is selected from the group consisting of copper sulfides, tin sulfides, manganese sulfides, titanium sulfides and iron sulfides.

12. The method of claim 3, wherein the method does not utilize ion exchange to form the metal sulfide on the surface of the particles.

13. A method of removing pollutants from a flue gas stream comprising:
- collecting fly ash particles having an outer surface from the flue gas stream;
- modifying the outer surface of the fly ash particles with a metal sulfide by mixing the particles with metal sulfide by grinding, milling or incipient wetness to create modiefied fly ash particle; and
- injecting the modified fly ash particles into a flue gas stream under conditions to remove pollutants from the flue gas stream.

14. The method of claim 13, wherein the modifying step is performed at the same location as the flue-gas stream and modified fly ash particles are injected into the same flue gas stream.

15. The method of claim 14, wherein the modifying step includes reactive mixing the collected fly ash particles with a metal salt and a precursor sulfide salt.

16. A pollutant sorbent comprising fly ash particles having a metal sulfide formed by grinding, milling or incipient wetness on the outer surface of fly ash particles.

17. The sorbent of claim 16, wherein the particles have a surface area less than about $10\,m^2/g$ and are formed by mixing fly ash particles with a metal salt and a precursor sulfide.

18. The sorbent of claim 1, wherein the metal salt includes a metal selected from the group consisting of copper, tin, titanium, iron, manganese and combinations thereof.

19. The method of claim 13, wherein the metal sulfide is selected from copper sulfide, tin sulfide, manganese sulfide, titanium sulfide, iron sulfide and combinations thereof.

20. The sorbent of claim 16, wherein the metal sulfide is selected from the group consisting of copper sulfide, tin sulfide, manganese sulfide, titanium sulfide, iron sulfide and combinations thereof.

* * * * *

UNITED STATES PATENT AND TRADEMARK OFFICE
CERTIFICATE OF CORRECTION

PATENT NO. : 7,575,629 B2  
APPLICATION NO. : 11/290630  
DATED : August 18, 2009  
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Seventh Day of September, 2010

David J. Kappos  
*Director of the United States Patent and Trademark Office*